March 14, 1933.    A. R. PAULLIN    1,901,327
HEDGE TRIMMER
Filed Feb. 17, 1932    2 Sheets-Sheet 1
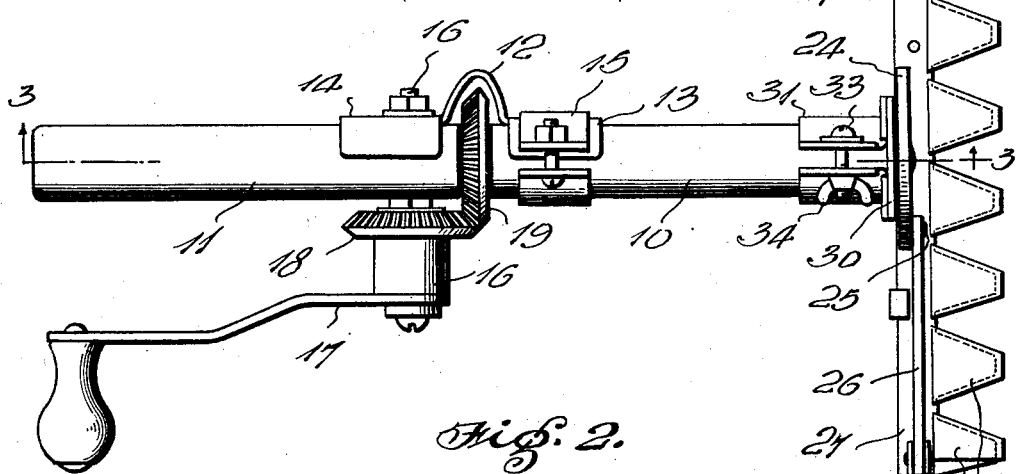
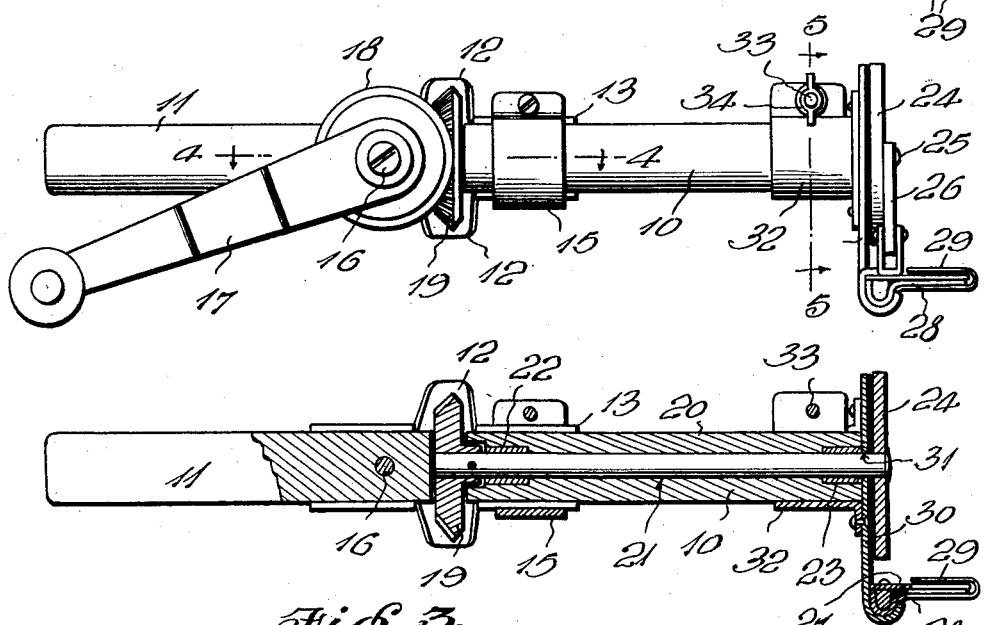
Witness
H. Woodard
Inventor
Amos R. Paullin
By H. B. Willson & Co.
Attorneys.

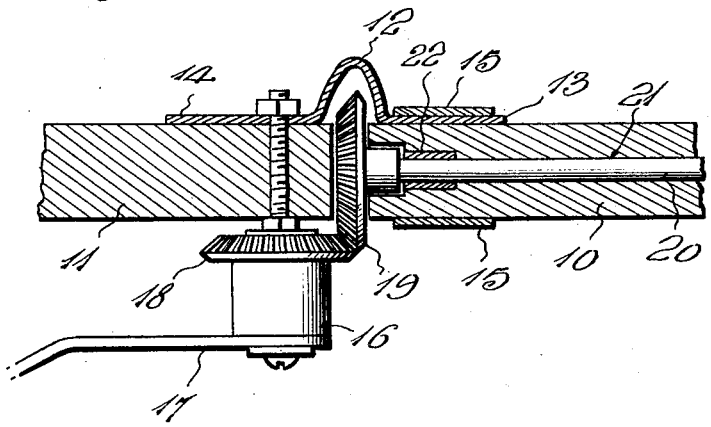
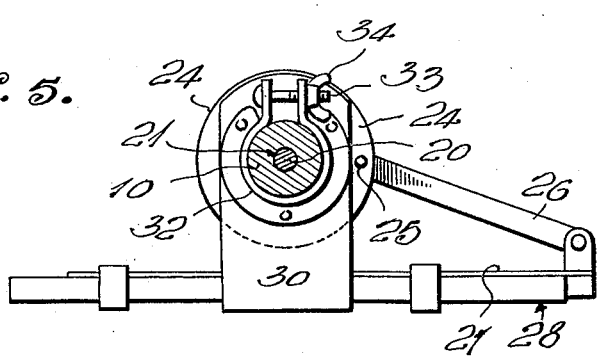
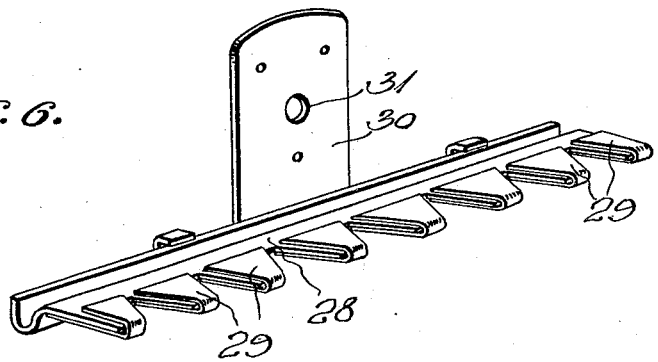

Patented Mar. 14, 1933

1,901,327

UNITED STATES PATENT OFFICE

AMOS R. PAULLIN, OF NEWTON, IOWA

HEDGE TRIMMER

Application filed February 17, 1932. Serial No. 593,609.

The invention aims primarily to provide a new and improved hedge trimmer embodying a reciprocatory sickle bar so that fine growth on hedges may be more easily and more smoothly trimmed than with the conventional trimming shears.

In carrying out the above end, a further object is to provide a hedge trimmer which may be easily operated by hand but may if desired be constructed for power operation, preferably by an electric motor.

A further object is to make novel provision whereby the trimming head may be adjusted to various angles about the axis of a handle which carries said head, so that a hand crank which operates the movable cutter, may be always rotated in the most convenient plane, regardless of the position which the trimming head must occupy.

A still further object is the provision of an exceptionally simple and inexpensive construction, yet one which will be efficient, long-lived and generally desirable.

With the foregoing in view, the invention resides in the novel subject matter hereinafter described and claimed, description being accomplished by reference to the accompanying drawings.

Fig. 1 is a top plan view.

Fig. 2 is a side elevation.

Figs. 3 and 4 are longitudinal sectional views on lines 3—3 and 4—4 of Figs. 1 and 2 respectively.

Fig. 5 is a transverse sectional view on line 5—5 of Fig. 2.

Fig. 6 is a perspective view of part of the trimming head.

A preferred construction has been illustrated and will be specifically described, with the understanding however, that within the scope of the invention as claimed, variations may be made.

The numerals 10 and 11 denote two elongated handle sections disposed end to end in spaced relation and rigidly connected with each other by a channel-shaped connecting member 12, said connecting member having channel-shaped front and rear terminals 13 and 14 integral with its two side walls respectively and lying snugly against said handle sections. The terminal 13 is secured to the handle section 10 by means of a contractible clamp 15 surrounding said terminal and handle section, and this connection permits said handle section 10 and parts carried thereby to be disconnected from the rear handle section 11 and parts mounted on the latter, whenever this should be desirable for any reason, such as making repairs. The rear terminal 14 of the connecting member 12 is secured to the rear handle section 11 by means of a bolt 16, and rotatably mounted upon a portion of this bolt which projects laterally from the handle, is a hand crank 17 provided with a bevel gear or crown gear 18. This gear meshes with a similar gear 19 which is received in the space between the two handle sections 10 and 11 and has its peripheral portion received in the channel of the member 12, said gear 19 being fixed on the rear end of a longitudinal shaft 20 which passes through a central bore 21 in the handle section 10, the ends of said handle section being provided with appropriate bearings 22 and 23, for said shaft. The front end of shaft 20 carries a crank preferably formed by a disk 24 having a wrist pin 25, and by means of a pitman 26, said wrist pin is connected with a reciprocatory sickle bar 27 forming part of a trimming head at the front end of the handle.

The sickle bar 27 is slidably engaged with an appropriate cutter bar 28, the latter having appropriate guards 29. A bracket 30 rigidly carries the cutter bar 28 and the major portion of this bracket is of plate-like form and projects upwardly from said cutter bar. This plate-like bracket portion abuts the front end of the handle section 10 and is formed with an opening 31 through which the shaft 20 passes, and at its rear side, said bracket portion is provided with a contractible clamp or socket 32 which embraces the front end of the handle section 10, said clamp or socket being provided with a bolt 33 having a wing-nut 34. By loosening this wing-nut, the entire trimming head may be turned to any desired position about the axis of the handle, insuring that the hand crank 17 shall be turned in the most convenient plane, regardless of the angle at which the trimming head must operate.

To operate the trimmer, the handle section 11 is held in one hand and the hand crank 17 is rotated with the other, thereby causing the gears 18 and 19 to drive the shaft 20 and causing the crank 24—25 to operate the pitman 26, producing reciprocation of the sickel bar 27. The nut 34 may be loosened and the entire trimming head adjusted to any desired angle whenever advisable, and should it be desirable for any reason to disconnect the front and rear portions of the trimmer, this may be done by removing the clamp or collar 15.

Not only is the invention of extremely simple nature and therefore capable of easy, rapid and inexpensive manufacture, but it will be efficient, long-lived and very desirable, whether used merely for trimming hedges, or for other foliage trimming purposes.

While the details disclosed are preferably followed, attention is again invited to the fact that variations may be made within the scope of the invention as claimed.

I claim:

1. A hedge trimmer comprising front and rear handle sections spaced apart in end-to-end relation, a connecting member for said handle sections having channel-shaped terminals lying against said handle sections, means fixedly securing one of said terminals to one of said handle sections, a contractible collar clamped around the other of said terminals and the other of said handle sections, a rotary member mounted between said handle sections, driving means for said rotary member, trimming means mounted on the front end of the front handle section, and driving connections between said rotary member and said trimming means.

2. In a tool of the class described, front and rear alined handle sections, a gear between said handle sections mounted on an axis extending longitudinally of the latter, a channel-shaped connecting member whose channel receives the peripheral portion of said gear, the side walls of said connecting member being provided with front and rear channel-shaped terminals integral therewith and lying snugly against said front and rear handle sections respectively, a contractible clamp embracing said front channel-shaped terminal and said front handle section, a bolt passing through said rear channel-shaped terminal and said rear handle section and securing them together, and a hand-driven gear mounted on said bolt and meshing with the aforesaid gear.

In testimony whereof I affix my signature.

AMOS R. PAULLIN.